United States Patent [19]
Mehta et al.

[11] Patent Number: 5,749,418
[45] Date of Patent: May 12, 1998

[54] CEMENTITIOUS COMPOSITIONS AND METHODS FOR USE IN SUBTERRANEAN WELLS

[75] Inventors: Sudhir Mehta, Plano, Tex.; William J. Caveny, Rush Springs, Okla.

[73] Assignees: Halliburton Energy Services, Inc., Duncan, Okla.; Atlantic Richfield Company, Los Angeles, Calif.

[21] Appl. No.: 834,065

[22] Filed: Apr. 14, 1997

[51] Int. Cl.$^6$ .............................. E21B 33/13; C04B 22/12
[52] U.S. Cl. ........................ 166/292; 106/734; 106/736; 106/815
[58] Field of Search ..................... 106/734, 815, 106/736; 166/292, 293

[56] References Cited

U.S. PATENT DOCUMENTS

| | | | |
|---|---|---|---|
| 3,663,287 | 5/1972 | Mizunuma et al. | 106/315 |
| 3,887,009 | 6/1975 | Miller et al. | 166/292 |
| 4,045,236 | 8/1977 | Bianchi | 106/678 |
| 4,132,558 | 1/1979 | Uchikawa et al. | 588/257 |
| 4,444,593 | 4/1984 | Schutz | 106/692 |
| 5,387,740 | 2/1995 | Sasae et al. | 588/257 |
| 5,397,516 | 3/1995 | Sikaffy | 106/672 |
| 5,512,096 | 4/1996 | Krause | 106/718 |
| 5,547,024 | 8/1996 | Arias | 166/292 |

FOREIGN PATENT DOCUMENTS

| | | | |
|---|---|---|---|
| 53-012929 | 2/1978 | Japan | 106/815 |
| 814927 | 3/1981 | U.S.S.R. | 106/815 |

OTHER PUBLICATIONS

Chemical Abstract No. 70:60504 which is an abstract of an article by Ved et al, entitled "Liquid Phase of Hydrated Portland Cement Containing Inorganic Salt Additives", (1968) [No. Month].

Chemical Abstract No. 75:9537 which is an abstract of an article by Zharov et al, entitled "Effect of Soluble Chlorides . . . Moisture Treatment". (1970) [No Month].

Chemical Abstract No. 78:33390 which is an abstract of an article by Avsyukevich, entitled Effect of a Ferric Chloride . . . On It's Reinforcement (1972) [No Month].

Chemical Abstract No. 84:78711 which is an abstract of an article by Alimov et al, entitled "Effect Of Hardening . . . Of Concrete"(1975) [No Month].

Chemical Abstract No. 90:173527 which is an abstract of an article by Ved et al, entitled "Effect of Iron (III) Chloride On Portland Cement Properties", (1977) [No Month].

Chemical Abstract No. 93:12385 which is an abstract of Soviet Union Patent Specification No. 717001 ( (Feb. 1980).

Chemical Abstract No. 108:61453 which is an abstract of Japanese Patent Specification No. 62-225652 (Oct. 1987).

Chemical Abstract No. 116:179840 which is an abstract of Chinese Patent Specification No. 1054959 (Oct. 1991).

WPIDS Abstract No. 93-402468 which is an abstract of Soviet Union Patent Specification No. 1776761 (Nov. 1992).

WPIDS Abstract No. 96-199218 which is an abstract of Russian Federation Patent Specification No. 1091616 (Sep. 1995).

*Primary Examiner*—Anthony Green
*Attorney, Agent, or Firm*—Craig W. Roddy

[57] ABSTRACT

A cementitious composition is provided comprising a hydraulic cementitious material, iron chloride and sufficient water to form a pumpable slurry. The iron chloride predictably enhances the rheology and performance of the composition. Methods of cementing subterranean wells are accomplished by mixing together the hydraulic cementitious material, iron chloride and sufficient water to form a pumpable slurry; pumping the slurry to a selected location within the wellbore; and then allowing the slurry to solidify within the well.

20 Claims, No Drawings

CEMENTITIOUS COMPOSITIONS AND METHODS FOR USE IN SUBTERRANEAN WELLS

BACKGROUND OF THE INVENTION

The present invention relates generally to cementitious compositions, and more particularly, to cementitious compositions containing iron chloride and methods whereby these compositions are placed in subterranean wells and allowed to set therein.

Cements are divided into various classes depending upon their chemical and physical properties and their application. For instance, the American Society for Testing and Materials (ASTM) divides cement into various types. The ASTM classes of cement range from Type I through Type V. In the oil and gas well construction industry, the American Petroleum Institute (API) has set standards for different classes of cement, similar to those established by the ASTM. The API has divided cements for use in oil and gas wells into eight different classes, classes A through H. Because stricter requirements are necessary for some cements to ensure proper performance of the cement and the cement slurry, it is necessary to have these different classes. Cement and cement slurries which are pumped downhole within oil and gas wells are subjected to various types of energy. This energy is mainly kinetic and thermodynamic energy having different intensities and duration levels which affect the cement's hydration rate, morphology and slurry properties.

Construction grade cements are commonly available from a variety of manufacturers and are very inexpensive when compared to cements used in cementing oil and gas wells. These construction grade cements typically contain from about 0.75% to about 3.0% alkali sulfate by weight of the cement depending on whether they are sodium, potassium, or double metal sulfate salts. Preferred oil well cements typically contain less than about 0.3% alkali sulfate by weight of the cement.

While inexpensive or construction grade cements may be suitable for a large number of surface applications, they seldom meet the requirements established by the API for parameters such as thickening time, free water, compressive strength and chemical makeup. The composition of the construction grade cements also varies from manufacturer to manufacturer making it hard to predict the physical properties and set times of the resulting cement and cement slurry. Thus, the construction grade cements are seldom, if ever, used in downhole applications. This is particularly true when cementing intermediate and production casing of oil and gas wells.

Because inexpensive cements are readily available, it would be advantageous to be able to convert or utilize them in oil and gas wells, particularly when cementing intermediate and production casing. Additionally, other cements that meet or would otherwise meet API specifications for oil well cement can have undesirable qualities such as poor rheology, marginal strength development or poor response due to additives, admixtures or contaminants; therefore, it is often desirable to enhance the rheology and performances thereof.

BRIEF SUMMARY OF THE INVENTION

A preferred cement composition comprises an admixture of cement with more than about 0.3% alkali sulfate by weight of the cement and iron chloride, e.g., ferrous chloride ($FeCl_2$), ferric chloride ($FeCl_3$) or mixtures thereof, in an amount in the range of from about 0.1% to about 10.0% by weight of dry cement therein, and more particularly in the range of from about 0.5% to about 2.0% by weight of dry cement therein. Yet, another preferred cement composition of the present invention comprises an admixture of Portland cement that meets API specifications for oil well cement and iron chloride, e.g., ferrous chloride ($FeCl_2$), ferric chloride ($FeCl_3$) or mixtures thereof, in an amount in the range of from about 0.1% to about 10.0% by weight of dry cementitious material therein, and more particularly in the range of from about 0.5% to about 2.0% by weight of dry cementitious material therein.

A method of cementing a wellbore of an oil and gas well is accomplished by adding water to the admixture in a sufficient amount to form a pumpable slurry. The slurry is then pumped to a selected location in the wellbore and allowed to solidify.

It is, therefore, a general object of the present invention to provide cementitious compositions which contain iron chloride and methods of cementing a wellbore therewith.

Other and further objects, features and advantages of the present invention will be readily apparent to those skilled in the art upon a reading of the description.

DETAILED DESCRIPTION OF THE INVENTION

The cementitious compositions and methods of the present invention are preferably for use in oil and gas well drilling operations. The present invention utilizes iron chlorides to significantly improve the performance of hydraulic cementitious materials such as any Portland cement, especially inexpensive or construction grade cements that are high in alkali sulfate content, i.e., more than about 0.3% alkali sulfate by weight of the cement.

Iron chloride compounds utilized in the present invention include ferrous chloride ($FeCl_2$), ferric chloride ($FeCl_3$) and mixtures thereof. Preferred construction grade cements, which do not meet API specifications, are commonly available from a variety of manufacturers and are very inexpensive as compared to the higher grades of cements used in cementing oil and gas wells. Physically, the construction grade cements do not meet the requirements for thickening time and compressive strength necessary for use in oil well cementing operations.

These construction grade or inexpensive cements typically contain from about 0.75% to about 3.0% alkali sulfate by weight of the cement depending on whether they are sodium, potassium, or double metal sulfate salts. In comparison, cements that meet API specifications for oil well cement typically contain less than about 0.3% alkali sulfate by weight of the cement. Thus, preferred hydraulic cements are defined herein as those which have more than about 0.3% alkali sulfate content by weight of the cement.

Improved well cement compositions of the present invention are comprised of hydraulic cementitious materials such as construction grade or inexpensive hydraulic cements which have more than about 0.3% alkali sulfate by weight of the cement, cements that meet API specifications for oil well use and the like; sufficient water to form a pumpable slurry; and iron chloride selected from the group consisting ferrous chloride, ferric chloride and mixtures thereof. The iron chloride is present in an amount in the range of from about 0.1% to about 10.0% by weight of the dry cementitious material therein, and more preferably in the range of from about 0.5% to about 2.0% by weight of the dry cementitious material therein. Additionally, other known additives may also be included in the compositions including fluid loss additives, retarders, dispersants, and viscosity reducers.

The water used in the cementitious compositions can be water from any source provided that it does not contain an excess of compounds which adversely react with or otherwise affect other components in the composition. Preferably, fresh water is present in the range of from about 20% to about 150% by weight of dry cementitious material therein.

In order to evaluate the affect of iron chloride on cements to improve their characteristics for use in subterranean conditions, tests were conducted using different commercially available cements which had more than 0.3% alkali sulfate by weight of cement, as well as, a Portland cement which meets API specifications for oil well use. Table I shows the results of tests conducted using the different cement compositions. The compositions were evaluated using ferric chloride amounts ranging from 1.25% to 2.00% by weight of dry cement (bwoc) therein. All tests were carried out in accordance with API Spec. 10A procedures. Table II shows the corresponding viscosity readings for the samples shown in Table I.

cementitious material (bwoc) was added to bring the slurries to their desired consistency. The amount of iron chloride added by weight of the cementitious material depends on the desired thickening time for the specific application and requirements, such as compressive strength, fluid loss control and gas control properties. The actual amount of iron chloride required for different brands of poor quality cement may also vary and should be determined by lab testing prior to the cementing job.

As previously mentioned, some cements that meet API specifications for oil well cement can have undesirable qualities such as poor rheology, marginal strength development and poor response to other additives or admixtures, e.g., retarders, accelerator dispersants and fluid loss agents. Therefore, iron chloride may be added to any hydraulic cementitious material, such as Portland cement or the like, whose rheology and performance is enhanced thereby.

Once a cementitious composition of the present invention is formulated into a pumpable slurry, it is pumped into a

TABLE I

THICKENING TIMES

| SAMPLE # | HYDRAULIC MATERIAL | IRON % (bwoc) | ALKALI SO % (bwoc) | WATER % (bwoc) | FECL3 % (bwoc) | SCR100L[1] GAL/SK | HALAD ®-344L[2] GAL/SK | HALAD ®-344[3] % (bwoc) | LB/ GAL | °F. | THICKENING TIME |
|---|---|---|---|---|---|---|---|---|---|---|---|
| 1 | Class G Cement | 5.5 | 1.90 | 45.1 | 0 | 0 | 0 | 0 | 15.8 | 100 | 6 hr 30 min |
| 2 | Class G Cement | 5.5 | 1.90 | 45.1 | 1.5 | 0 | 0 | 0 | 15.8 | 100 | 2 hr 50 min |
| 3 | Class G Cement | 4.3 | 1.74 | 38 | 0 | 0.1 | 1.1 | 0 | 15.5 | 167 | 9 hr 30 min |
| 4 | Class G Cement | 4.3 | 1.74 | 38 | 1.5 | 0.1 | 1.1 | 0 | 15.5 | 167 | 3 hr 34 min |
| 5 | Class G Cement | 4.3 | 1.74 | 38 | 2.0 | 0.1 | 1.1 | 0 | 15.5 | 167 | 2 hr 0 min |
| 6 | Class H Cement | 5.5 | 0.2 | 39 | 0 | 0.05 | 0 | 0.4 | 16.4 | 167 | 3 hr 17 min |
| 7 | Class H Cement | 5.5 | 0.2 | 39 | 1.25 | 0.05 | 0 | 0.4 | 16.4 | 167 | 1 hr 15 min |

[1]"SCR100" Liquid from Halliburton Energy Services, Duncan, Oklahoma
[2]Fluid Loss Additive (HALAD ®-344L available from Halliburton Energy Services, Duncan, Oklahoma)
[3]Fluid Loss Additive (HALAD ®-344 available from Halliburton Energy Services, Duncan, Oklahoma)

TABLE II

FERRIC CHLORIDE SLURRIES FANN 35 AT 80° F.

| # | HYDRAULIC MATERIAL | 300 RPM | 200 RPM | 100 RPM | 6 RPM | 3 RPM | PV/YP |
|---|---|---|---|---|---|---|---|
| 1 | Class G Cement | 72 | 61 | 49 | 30 | 28 | 35/37 |
| 2 | Class G Cement | 68 | 60 | 50 | 33 | 28 | 27/41 |
| 3 | Class G Cement | 153 | 112 | 66 | 9 | 7 | 131/22 |
| 4 | Class G Cement | 168 | 125 | 78 | 13 | 10 | 135/33 |
| 5 | Class G Cement | — | — | — | — | — | — |
| 6 | Class H Cement | 113 | 82 | 46 | 4.5 | 7 | 101/12 |
| 7 | Class H Cement | 150 | 112 | 68 | 11 | 8 | 123/27 |

As can been seen from the results set forth in Table I, the thickening times for all samples were significantly reduced with the addition of ferric chloride. Water in an amount ranging from about 38% to about 45% by weight of dry desired location within the wellbore. Cementing is usually accomplished by pumping the slurry down through the well casing. A separate fluid is then pumped into the well casing after this so that the cement slurry is forced or squeezed out of the bottom of the casing and back up through the annulus or space between the exterior of the well casing and the borehole to the desired location. The slurry is then allowed to solidify in situ.

The present invention has several advantages in that inexpensive or construction grade cements that are high in alkali sulfate can be converted for use in oil and gas well construction. The iron chloride alters the cement's chemical and physical properties so that the compressive strength and thickening times are improved to meet API standards. Further, the iron chlorides of the present invention are useful in Portland cements, which meet API specifications for oil well cement, where enhanced rheology and performances of the resulting compositions are desired.

To the applicant's knowledge there has been no use of iron chloride in hydraulic cementitious materials, and more particularly with cements containing more than about 0.3% alkali sulfate by weight of the cement, to convert them into a usable form for subsurface cementing operations of oil and gas wells. Thus, the present invention is well adapted to attain the ends and advantages mentioned in addition to those which are inherent therein. While numerous changes may be made by those skilled in the art, such changes are encompassed within the spirit of this invention as defined by the appended claims.

What is claimed is:

1. A method of cementing a wellbore comprising the steps of:

forming a cementitious composition comprising a hydraulic cement which contains more than about 0.3% alkali sulfate by weight thereof, sufficient water to form a pumpable slurry, and iron chloride present in an amount in the range of from about 0.1% to about 10% by weight of said cement;

pumping the slurry into the wellbore; and allowing the slurry to solidify within the wellbore.

2. The method of claim 1 wherein said iron chloride is selected from ferrous chloride, ferric chloride or mixtures thereof.

3. The method of claim 1 wherein said cement is Portland cement.

4. The method of claim 1 wherein said iron chloride is present in an amount in the range of from about 0.5% to about 2% by weight of cement in the composition.

5. The method of claim 1 wherein said water is present in the range of from about 20% to about 150% by weight of cement in the composition.

6. The method of claim 1 wherein said cement contains more than about 0.5% alkali sulfate by weight thereof.

7. The method of claim 1 wherein said cement contains more than about 1.0% alkali sulfate by weight thereof.

8. The method of claim 1 wherein said cement contains more than about 1.5% alkali sulfate by weight thereof.

9. A method of cementing a wellbore comprising the steps of:

forming a cementitious composition comprising Portland cement which contains more than about 0.3% alkali sulfate by weight thereof; sufficient water to form a pumpable slurry; and iron chloride selected from ferrous chloride, ferric chloride or mixtures thereof present in an amount in the range of from about 0.1% to about 10% by weight of said cement;

pumping the slurry into the wellbore; and allowing the slurry to solidify within the wellbore.

10. The method of claim 9 wherein said iron chloride is present in an amount in the range of from about 0.5% to about 2% by weight of cement in the composition.

11. The method of claim 9 herein said water is present in the range of from about 20% to about 150% by weight of cement in the composition.

12. The method of claim 9 wherein said cement contains more than about 0.5% alkali sulfate by weight thereof.

13. The method of claim 9 wherein said cement has more than about 1.0% alkali sulfate by weight thereof.

14. The method of claim 9 wherein said cement has more than about 1.5% alkali sulfate by weight thereof.

15. A method of cementing a wellbore comprising the steps of:

forming a cementitious composition comprising a hydraulic cement which contains more than about 0.3% alkali sulfate by weight thereof; water present in the range of from about 20% to about 150% by weight of cement in the composition; and iron chloride selected from ferrous chloride, ferric chloride or mixtures thereof present in an amount in the range of from about 0.1% to about 10% by weight of said cement;

pumping the slurry into the wellbore; and allowing the slurry to solidify within the wellbore.

16. The method of claim 15 wherein said iron chloride is present in an amount in the range of from about 0.5% to about 2% by weight of cement in the composition.

17. The method of claim 15 wherein said cement is Portland cement.

18. The method of claim 15 wherein said cement contains more than about 0.5% alkali sulfate by weight thereof.

19. The method of claim 15 wherein said cement has more than about 1.0% alkali sulfate by weight thereof.

20. The method of claim 15 wherein said cement has more than about 1.5% alkali sulfate by weight thereof.

* * * * *